United States Patent
Chen

(10) Patent No.: US 8,650,799 B2
(45) Date of Patent: Feb. 18, 2014

(54) VEHICLE DOOR OPENING WARNING SYSTEM

(76) Inventor: Chung-Hsien Chen, New Taipei (TW)

(*) Notice: Subject to any disclaimer, the term of this patent is extended or adjusted under 35 U.S.C. 154(b) by 131 days.

(21) Appl. No.: 13/273,300

(22) Filed: Oct. 14, 2011

(65) Prior Publication Data

US 2013/0091770 A1    Apr. 18, 2013

(51) Int. Cl.
*E05F 15/06* (2006.01)

(52) U.S. Cl.
USPC .................... 49/26; 49/28; 296/146.1

(58) Field of Classification Search
USPC ............ 49/26, 27, 28; 296/146.4, 146.1, 152
See application file for complete search history.

(56) References Cited

U.S. PATENT DOCUMENTS

| | | | | |
|---|---|---|---|---|
| 4,674,230 A * | 6/1987 | Takeo et al. | | 49/32 |
| 5,074,073 A * | 12/1991 | Zwebner | | 49/26 |
| 5,121,098 A * | 6/1992 | Chen | | 340/457 |
| 7,175,227 B2 * | 2/2007 | Menard | | 296/146.4 |
| 8,234,817 B2 * | 8/2012 | Neundorf et al. | | 49/280 |
| 8,414,062 B2 * | 4/2013 | Gobart et al. | | 296/146.4 |
| 2005/0280284 A1 * | 12/2005 | McLain et al. | | 296/146.1 |
| 2008/0218381 A1 * | 9/2008 | Buckley et al. | | 340/932.2 |
| 2008/0296927 A1 * | 12/2008 | Gisler et al. | | 296/146.4 |
| 2008/0309118 A1 * | 12/2008 | Kohlstrand | | 296/146.1 |
| 2011/0260848 A1 * | 10/2011 | Rodriguez Barros et al. | | 340/438 |

* cited by examiner

*Primary Examiner* — Gregory J. Strimbu
(74) *Attorney, Agent, or Firm* — Rosenberg, Klein & Lee

(57) ABSTRACT

A vehicle door opening warning system for a car includes a sensor for sensing the approaching of another car from behind when a person is opening the car door, a car door-opening control unit stops the car door from being opened when the sensor senses the approaching of the other car from behind, and a warning light and a buzzer are activated to give a visual warning signal and an audio warning signal when the car door is being opened.

4 Claims, 6 Drawing Sheets

VEHICLE DOOR OPENING WARNING SYSTEM

BACKGROUND OF THE INVENTION

1. Field of the Invention

The present invention relates to vehicle safety and pre-warning technology and more particularly, to a vehicle door opening warning system, which gives audio and visual warning signals when the car door is being opened, and limits the opening angle of the car door when a sensor at the car door senses the approaching of a car from behind.

2. Description of the Related Art

Following fast development of technology, many vehicle security and safety related products have been continuously created to enhance driving safety. A vehicle may be equipped with rearview monitor system for enabling the driver to view any vehicle or object approaching from behind. However, this rearview monitor system has its rearview dead angle. When a car driver or a person in a car is opening a car door of the car, the driver or person may be unaware of a car or moving object from behind, causing an accident. Even an experienced car driver may be unable to control any person sharing the car from opening the car door upon a sudden approaching of car or object from behind. Further, a vehicle may be equipped with a variety of signal lights, however, no warning light is designed to give a visual pre-warning signal when a car door is going to be opened.

SUMMARY OF THE INVENTION

The present invention has been accomplished under the circumstances in view. It is one object of the present invention to provide a vehicle door opening warning system, which gives audio and visual warning signals when the car door is being opened. It is another object of the present invention to provide a vehicle door opening warning system, which limits the opening angle of the car door when a sensor at the car door senses the approaching of a car from behind.

DETAILED DESCRIPTION OF THE PREFERRED EMBODIMENT

Figure 1:
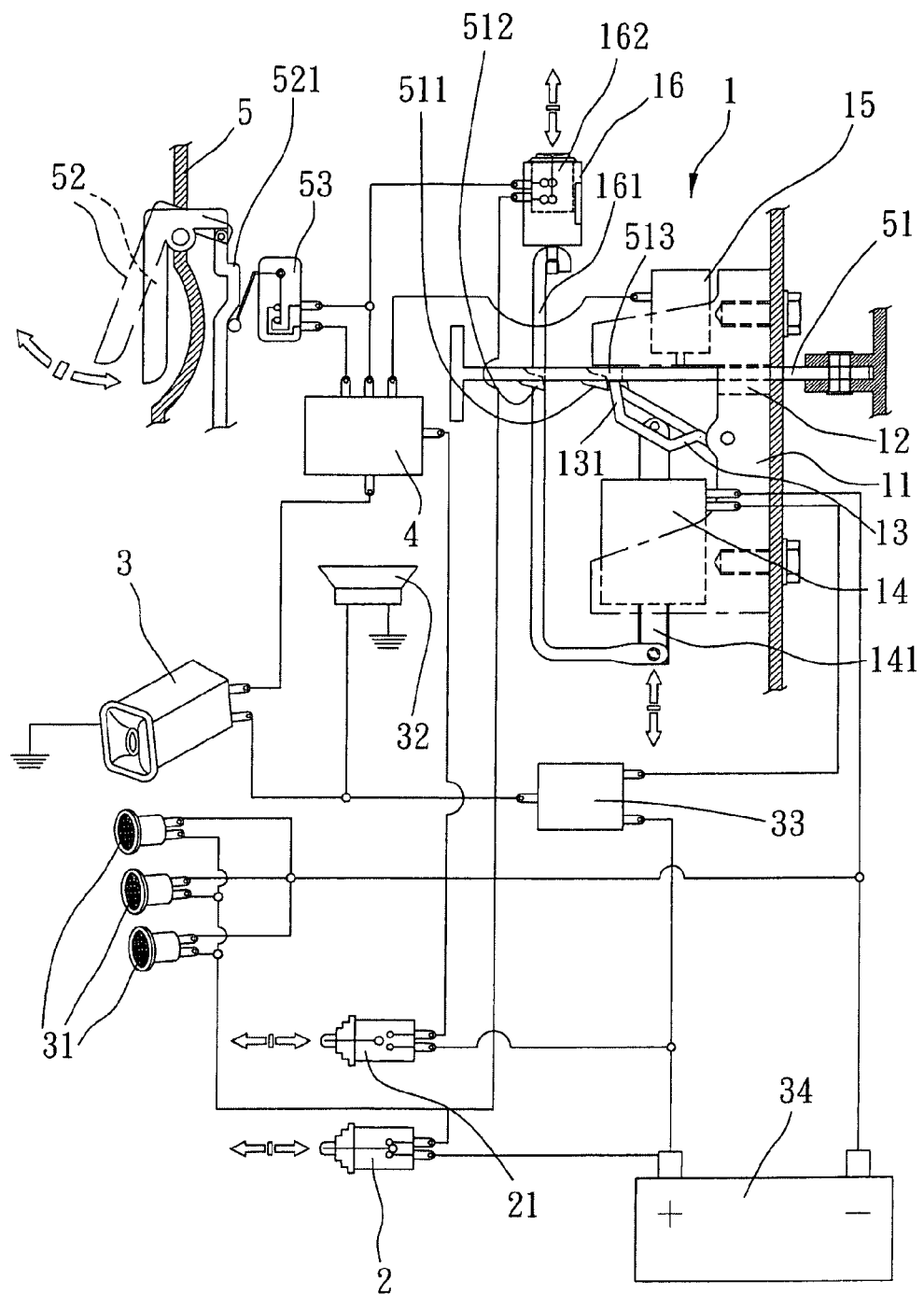
FIG. 1 is a circuit block diagram of a vehicle door opening warning system in accordance with the present invention.
Figure 2:
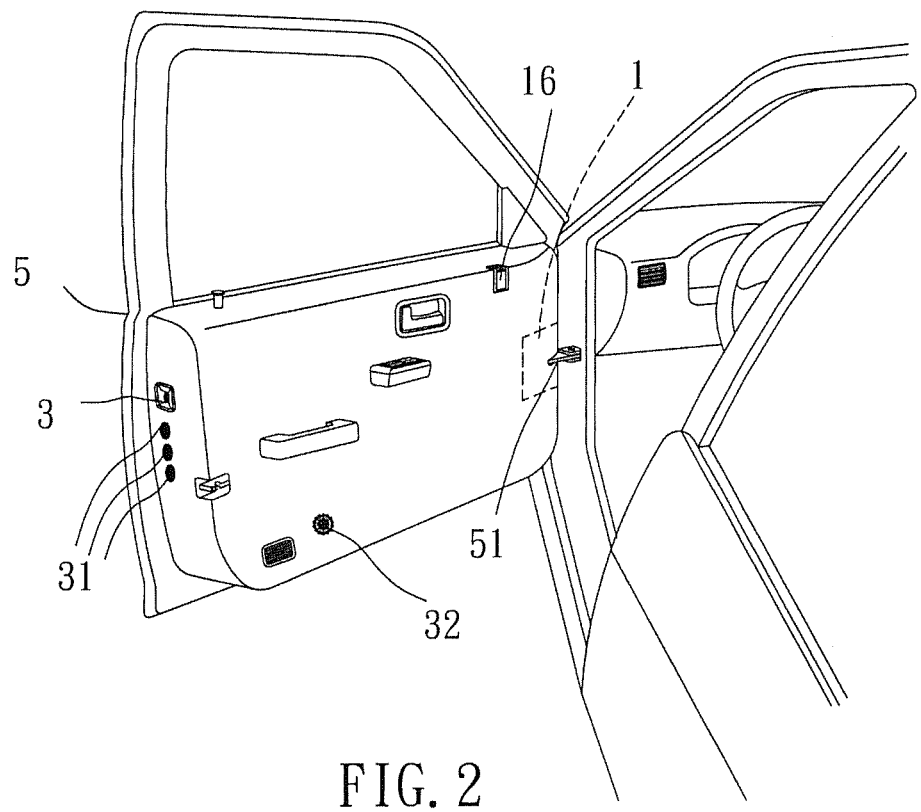
FIG. 2 is a schematic drawing of a part of the present invention, illustrating the related component parts of the vehicle door opening warning system installed in a car door of a car.
Figure 3:
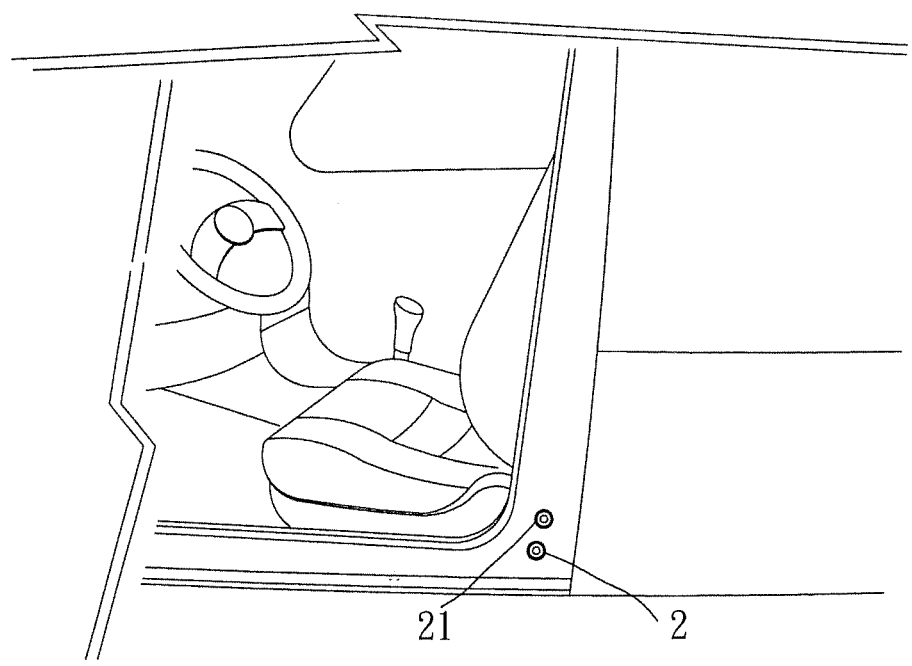
FIG. 3 is schematic drawing a part of the present invention, illustrating one normally closed contact switch and one normally opened contact switch of the vehicle door opening warning system mounted in the car door frame of the car.
Figure 4:
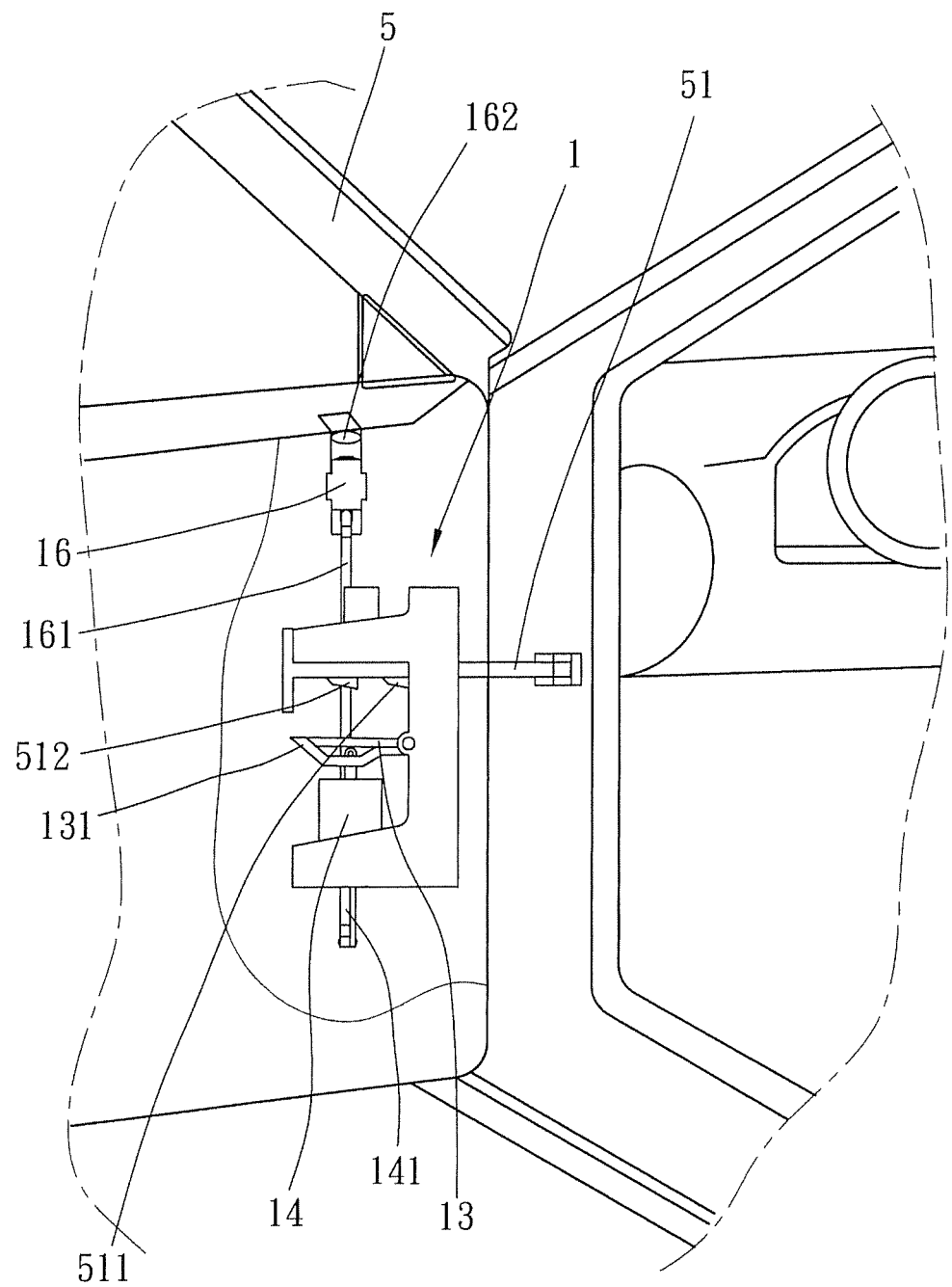
FIG. 4 is a schematic drawing of a part of the present invention, illustrating the positioning of the car door-opening control unit of the vehicle door opening warning system in the car door of the car.
Figure 5:
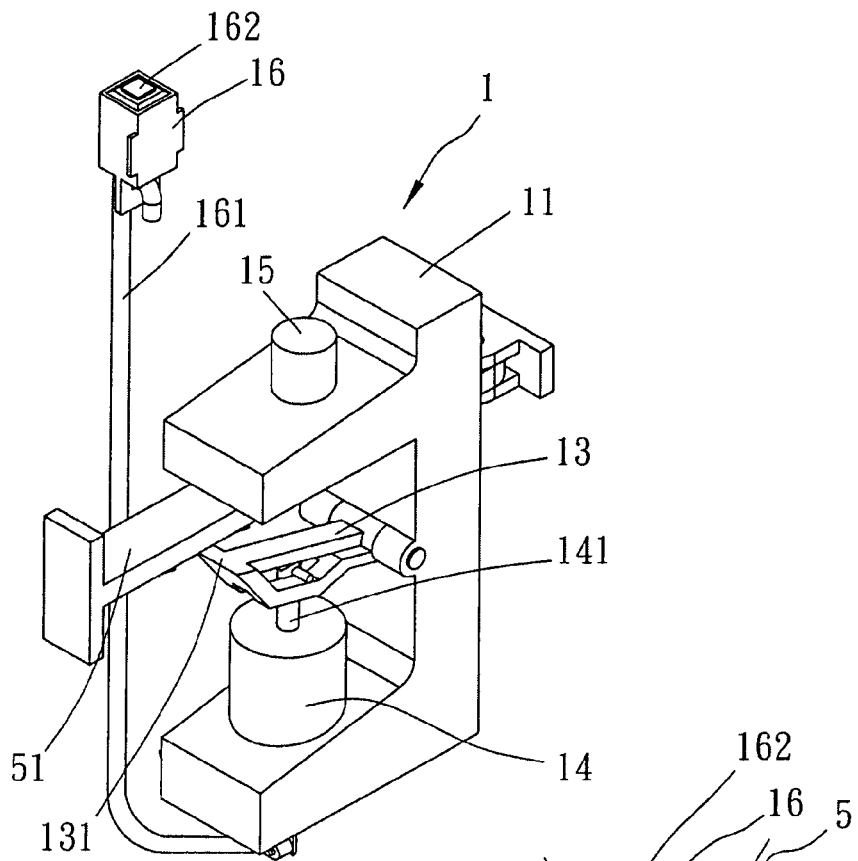
FIG. 5 is an elevational view of the car door-opening control unit of the vehicle door opening warning system in accordance with the present invention.

Referring to FIGS. 1~5, a vehicle door opening warning system in accordance with the present invention is shown comprising a car door-opening control unit 1 installed in a linkage 51 of a car that extends out of a car door frame that is movable to open/close a car door 5 that is hinged to the car door frame, a normally closed contact switch 2 and a normally opened contact switch 21 mounted in the car door frame of the car, an approaching object sensor 3 mounted in the free end of the car door 5, one or a series of warning lights 31 mounted in the free end of the car door 5, a buzzer 32, a relay 33, a battery 34, and a controller 4.

Figure 6:
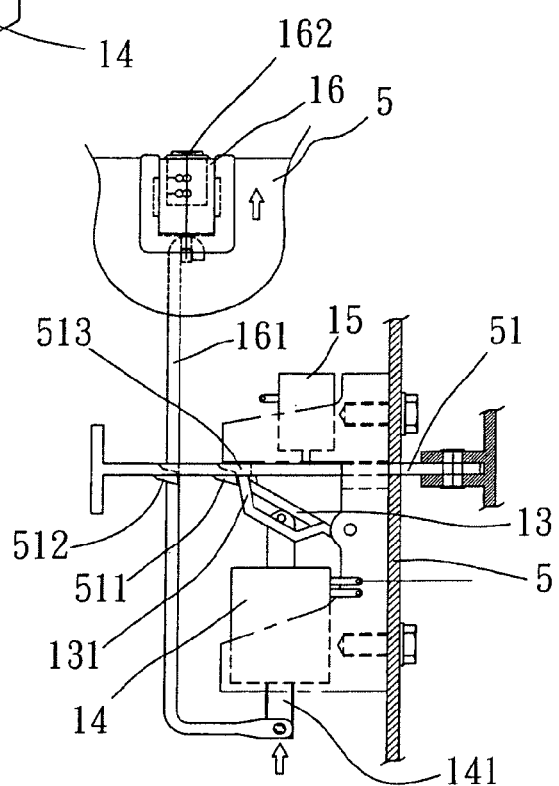
FIG. 6 is a schematic side view of a part of the present invention, illustrating the stop bar moved to the first position.
Figure 7:
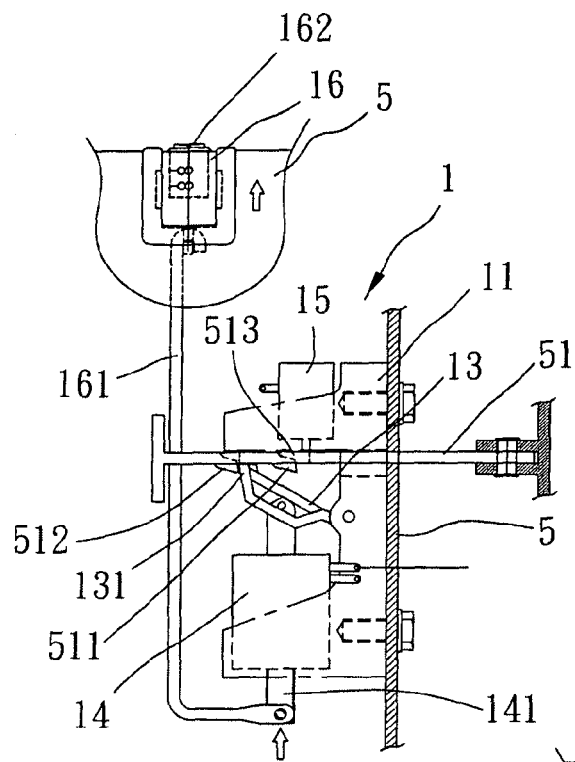
FIG. 7 is a schematic side view of a part of the present invention, illustrating the stop bar moved to the second position.

The car door-opening control unit 1 comprises a holder frame 11 having a through hole 12 for the passing of the linkage 51, an electromagnetic valve (solenoid) 14 mounted at a bottom side inside the holder frame 11 and operable to move a reciprocating rod 141 up and down, a stop bar 13 pivotally mounted in the holder frame 11 and having the free end 131 thereof supported on the reciprocating rod 141 and movable with the reciprocating rod 141 to one of a first position where the free end 131 of the stop bar 13 is stopped at a first stop portion 511 of the linkage 51 to prohibit the car door 5 from being opened, a second position where the free end 131 of the stop bar 13 is stopped at a second stop portion 512 of the linkage 51 to prohibit the car door 5 from being opened, and a third position where the free end 131 of the stop bar 13 is released from the linkage 51 for allowing the car door 5 to be opened. When a person is opening the car door 5, the normally closed contact switch 2 is released from the pressure of the car door 5 for allowing the battery power supply of the battery 34 to be conducted through normally closed contact switches 162 and 53 to the controller 4 to operate the approaching object sensor 3 and the warning lights 31, causing the approaching object sensor 3 to sense any approaching object (car) and the warning lights 31 to give a visual warning signal (to give off light or to flash). If the approaching object sensor 3 senses the approaching of an external object (car) at this time, it gives a signal to the controller 4, causing the controller 4 to drive the buzzer 32 in giving an audio warning signal and to switch on the relay 33 in starting the electromagnetic valve 14 to that the electromagnetic valve 14 extends out the reciprocating rod 141 to lift the free end 131 of the stop bar 13 to the first position where the free end 131 of the stop bar 13 is stopped at the first stop portion 511 of the linkage 51 to prohibit the car door 5 from being opened (see FIG. 6). After the external object passed and the approaching object sensor 3 senses no signal, the controller 4 receives no signal from the approaching object sensor 3 and switches off the relay 33 to cut off the battery power supply from the electromagnetic valve 14, allowing the free end 131 of the stop bar 13 to be lowered with the reciprocating rod 141 to the third position for allowing the car door 5 to be opened. If the approaching object sensor 3 senses a signal again at this time, the controller 4 switches on the relay 33 to start the electromagnetic valve 14 again, enabling the free end 131 of the stop bar 13 to be lifted by the reciprocating rod 141 to the second position where the free end 131 of the stop bar 13 is stopped at a second stop portion 512 of the linkage 51 to prohibit the car door 5 from being opened (see FIG. 7).

Figures 9, 10:
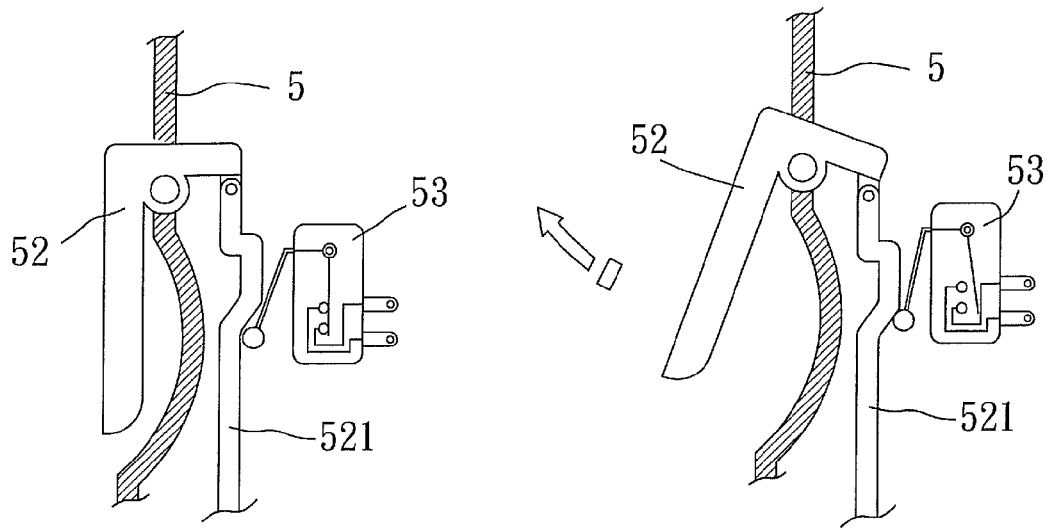
FIG. 9 is a schematic side view of a part of the present invention, illustrating the handle of the car door in the non-operative position and the related normally closed contact switch in the closed-circuit position.
FIG. 10 corresponds to FIG. 9, illustrating the handle of the car door biased and the related normally closed contact switch in the open-circuit position.

Further, the normally closed contact switch 53 is mounted in the car door 5 at an inner side relative to the handle 52 of the car door 5. When the handle 52 is operated to open the car door 5, a connected rod 521 of the handle 52 is forced to open the normally closed contact switch 53, causing the controller 4 to switch off the approaching object sensor 3 and the warning lights 31 (see FIG. 1, FIG. 9 and FIG. 10). When the car door 5 is closed, the normally opened contact switch 21 conducts the battery power supply to the controller 4, driving the approaching object sensor 3 into the standby mode for further sensing operation after a next opening action of the car door 5.

Figure 8:
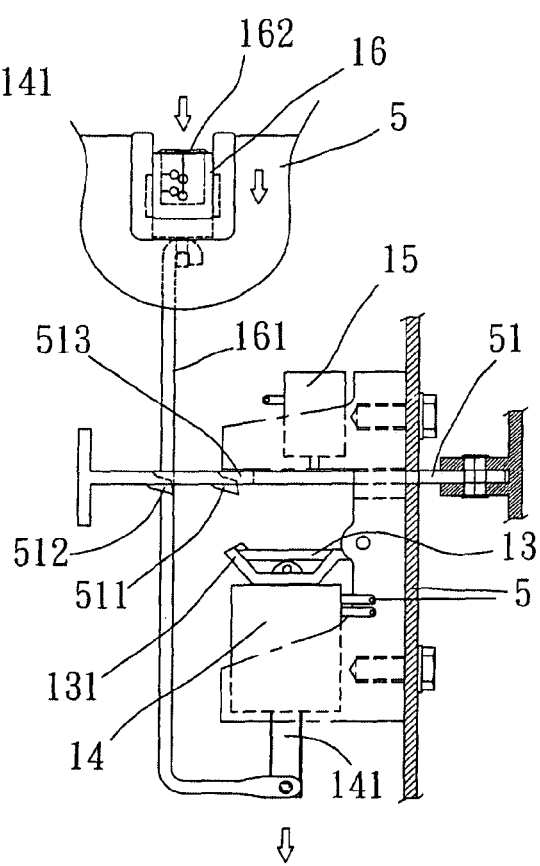
FIG. 8 is a schematic side view of a part of the present invention, illustrating the stop bar moved to the third position.

Further, a manual push button 16 is disposed at one side relative to the car door-opening control unit 1 operable to move a link 161 that is connected to the reciprocating rod 141 of the electromagnetic valve 14 and to open the normally closed contact switch 162. When the manual push button 16 is pressed by a person in an emergency or car crash, the normally closed contact switch 162 is opened to cut off the battery power supply from the car door-opening control unit 1, and the reciprocating rod 141 of the electromagnetic valve 14 is moved to lower the stop bar 13 from the linkage 51, allowing the car door 5 to be opened by a person (see FIG. 8).

Figure 11:
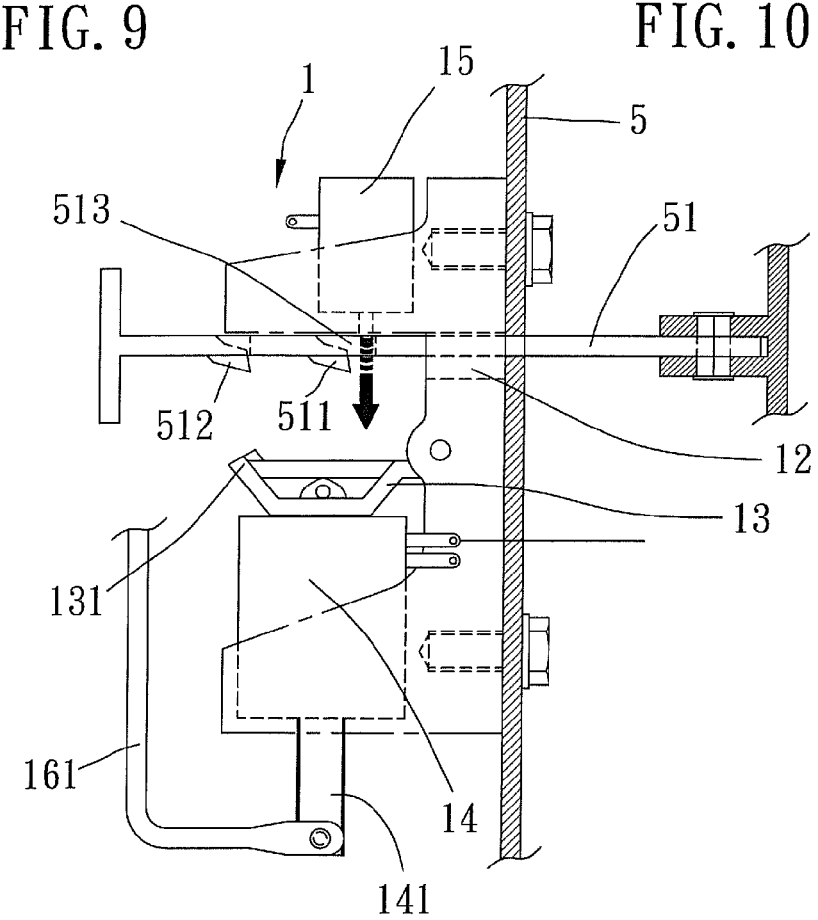
FIG. 11 is a schematic side view of the car door-opening control unit of the vehicle door opening warning system in accordance with the present invention, illustrating the through hole of the linkage in alignment with the photo sensor.

The car door-opening control unit 1 further comprises a photo sensor 15, which gives a signal to the controller 4 to switch off the sensor 3 when the linkage 51 is moved to open the car door 5 and to aim a through hole 513 thereof at the photo sensor 15 (see FIG. 11).

In conclusion, the invention provides a vehicle door opening warning system, which controls the opening angle of the car door to prevent a car crash and gives audio and visual warning signals when the car door is being opened.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A vehicle door opening warning system, comprising a car door-opening control unit installed in a car door that is hinged to a car door frame of a car, wherein a linkage of the car extends out from the car door frame of said car, wherein said linkage is movable with respect to said car door in response to one of an opening and a closing of said car door, a first normally closed contact switch mounted in said car door frame and a normally opened contact switch mounted in said car door frame, an approaching object sensor mounted in said car door, at least one warning light mounted in said car door, a buzzer, a relay, a battery, and a controller, said car door-opening control unit comprising a holder frame having a through hole, said linkage passing through said through hole, a solenoid mounted inside said holder frame and operable to move a reciprocating rod thereof toward said linkage and away from said linkage, a stop bar pivotally mounted to said holder frame and having a free end thereof supported by said reciprocating rod and said free end movable with said reciprocating rod to one of a first position where the free end of said stop bar engages one of a first stop portion of said linkage to prohibit said car door from being opened and a second stop portion of said linkage to prohibit said car door from being opened, and a second position where the free end of said stop bar is spaced from said linkage allowing said car door to be opened, wherein when a person is opening said car door, a pressure of said car door applied to said first normally closed contact switch is released allowing power from said battery to be conducted to said controller to operate said sensor to start sensing and to operate said at least one warning light to give a visual warning; when said approaching object sensor senses an approaching object while said car door is opening, said approaching object sensor sends a signal to said controller causing said controller to drive said buzzer to give an audio warning signal and to switch on said relay to start said solenoid so that said solenoid moves said reciprocating rod to lift said stop bar toward said linkage to said first position where said stop bar engages said first stop portion of said linkage to prohibit said car door from being opened; after the approaching object has passed said approaching object sensor and said approaching object sensor senses no signal, said approaching object sensor stops sending said signal to said controller and said controller switches off said relay to cut the battery power to said solenoid causing said reciprocating rod to lower said stop bar away from said linkage to said second position allowing said car door to be opened; when said approaching object sensor senses another approaching object while said car door is opening, said sensor sends said signal to said controller causing said controller to switch on said relay to start said solenoid again causing said reciprocating rod to lift said stop bar toward said linkage to said first position to engage said second stop portion of said linkage.

2. The vehicle door opening warning system as claimed in claim 1, further comprising a second normally closed contact switch mounted in said car door adjacent a handle of said car door, said handle operable to open said car door, wherein when said handle is operated to open said car door, a connection rod of said handle opens said second normally closed contact switch causing said controller to switch off said approaching object sensor and said at least one warning light; when said car door is closed, said normally opened contact switch causes said controller to put said approaching object sensor into a standby mode.

3. The vehicle door opening warning system as claimed in claim 1, wherein said car door-opening control unit further comprises a manual push button operably connected to a second normally closed contact switch; when said manual push button is pressed, said second normally closed contact switch is opened to cut off the battery power to said car door-opening control unit.

4. The vehicle door opening warning system as claimed in claim 1, wherein said car door-opening control unit further comprises a photo sensor for sending a signal to said controller to switch off the approaching object sensor when said photo sensor aligns with a hold in said linkage.

* * * * *